United States Patent
Hart et al.

(10) Patent No.: US 7,254,609 B2
(45) Date of Patent: Aug. 7, 2007

(54) METHOD FOR CHANNEL CONGESTION MANAGEMENT

(75) Inventors: Steven R. Hart, Carlsbad, CA (US); Mark J. Miller, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 835 days.

(21) Appl. No.: 10/732,671

(22) Filed: Dec. 9, 2003

(65) Prior Publication Data
US 2005/0144306 A1    Jun. 30, 2005

(51) Int. Cl.
*H04J 1/16*    (2006.01)
(52) U.S. Cl. ............ 709/203; 709/230; 370/230; 370/231; 455/434
(58) Field of Classification Search ............ 709/203, 709/220, 227; 370/230, 231, 232, 252, 389, 370/356; 455/404, 450
See application file for complete search history.

(56) References Cited

U.S. PATENT DOCUMENTS

| | | | |
|---|---|---|---|
| 4,630,264 A | 12/1986 | Wah et al. | |
| 5,319,641 A | 6/1994 | Fridrich et al. | |
| 5,898,681 A | 4/1999 | Dutta | |
| 6,374,099 B1 * | 4/2002 | Bi et al. | 455/404.1 |
| 6,888,824 B1 * | 5/2005 | Fang et al. | 370/359 |
| 6,952,427 B1 | 10/2005 | Seguin et al. | |
| 7,088,678 B1 * | 8/2006 | Freed et al. | 370/230 |
| 7,099,273 B2 * | 8/2006 | Ha et al. | 370/229 |
| 2001/0002196 A1 | 5/2001 | Fellman et al. | |
| 2002/0163933 A1 | 11/2002 | Benveniate | |
| 2005/0052992 A1 * | 3/2005 | Cloonan et al. | 370/229 |

OTHER PUBLICATIONS

IEEE INFOCOM 2001 by Zohar Naor and Hanoch Levy, entitled "A Centralized Dynamic Access Probability Protocol for Next Generation Wireless Networks," IEEE INFOCOM 2001 *The Conference on Computer Communications*, No. 1, Apr. 2001, pp. 767-775.

* cited by examiner

*Primary Examiner*—Khanh Dinh
(74) *Attorney, Agent, or Firm*—Townsend and Townsend and Crew LLP; Kenneth R. Allen

(57) ABSTRACT

A method for managing data traffic in a multiple-user multiple simultaneous access environment using a channel load estimate and a calculation. The estimate or estimates are used to calculate a congestion threshold (CT) and to select a current congestion threshold broadcast to all potential users. An experiment is performed by users comparing that congestion threshold value and a random number to determine if a packet is eligible to be transmitted, thus throttling the random transmission of packets so that the transmitted load from the terminal has a rate of packet transmission that is less than the congestion threshold times the offered load (from the user), where the congestion threshold value is related to the probability of a globally successful transmission of a number of simultaneously transmitted packets. A quality of service (QOS) factor may also throttle the transmitted load.

8 Claims, 11 Drawing Sheets

METHOD FOR CHANNEL CONGESTION MANAGEMENT

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to management of bandwidth resources in a packet telecommunication network, particularly at the datalink layer of a wireless network involving Multiple User Multiple Simultaneous Access (MUMSA) channels.

There are various bandwidth management schemes known for attempting to control traffic load, particularly at the datalink layer and the physical layer. Single simultaneous user traffic management is known in the random multiple access services environment for a Multiple User Single Simultaneous Access (MUSSA) channel. However, the known traffic management schemes are deficient when applied to MUMSA applications because a so-called multi-user channel of the current art allows only single simultaneous user access. As load is increased, collisions between two or more transmissions decrease efficiency. Examples relevant to the present invention are described in a paper presented at IEEE INFOCOM 2001 by Zohar Naor and Hanoch Levy, entitled "A Centralized Dynamic Access Probability Protocol for Next Generation Wireless Networks," IEEE INFOCOM 2001 *The Conference on Computer Communications*, No. 1, April 2001, pp. 767-775. In this paper, the channel load in a conventional ALOHA channel access protocol system is estimated by a measurement at the hub, then the hub sets a probability of access for the network and broadcasts that probability for use as a control or channel access restriction parameter to the network through a control channel or in a control timeslot. This protocol is not directly applicable to a multiple-simultaneous-user environment.

There are many multiple-user, single-channel protocols, but almost all such protocols rely on a central control to dole out channel access to a subset of the general user population. For example, in the well-known Code Division Multiple Access (CDMA) systems, a central authority allocates individual spreading codes to a number of users, one at a time. Thus, the random access on this MUMSA channel is accomplished by only a strictly controlled subset of the user population.

Code Reuse Multiple Access (CRMA) is an example of the MUMSA channel in which the entire user population is free to broadcast randomly. Here there is a true multiple-user, multiple simultaneous access environment, but it lacks sufficient control mechanisms to optimize channel utilization.

What is needed is a system for control of access to MUMSA channels that maximizes the channel utilization under all load conditions while minimizing the amount of overhead, and maintaining the low delay of a random access approach.

SUMMARY OF THE INVENTION

According to the invention, a method for managing data traffic in a multi-user multiple-simultaneous-access (MUMSA) environment, for example in a code reuse multiple access (CRMA) environment or other physical environment having true random access with more than one transmission present at the same time, the method including steps of providing a mechanism for estimating channel load for multiple users, then using the estimate of channel load to calculate a congestion threshold (CT) on an ongoing basis (which may be a probability of access), selecting a current congestion threshold, and then at each terminal performing an experiment using that congestion threshold value and a random number generator to determine if a packet is eligible to be transmitted, thus throttling the random transmission of packets so that the transmitted load from the terminal has a rate of packet transmission that is less than or equal to the congestion threshold times the offered load (from the user), where the congestion threshold value is related to the probability of a globally successful transmission of a number of simultaneously transmitted packets. In addition, the terminal may include a quality of service (QOS) factor to control the throttling of the transmitted load, allowing predictable data rates, latency and packet error rates. The experiment performed at the user terminal with congestion threshold value and the random number generator output as parameters determines whether the packet is actually transmitted or discarded. A basic load detection technique is disclosed for determining actual loads at the hub.

The invention will be better understood by reference to the following detailed description in connection with the accompanying drawings.

DETAILED DESCRIPTION OF THE INVENTION

Figure 1:
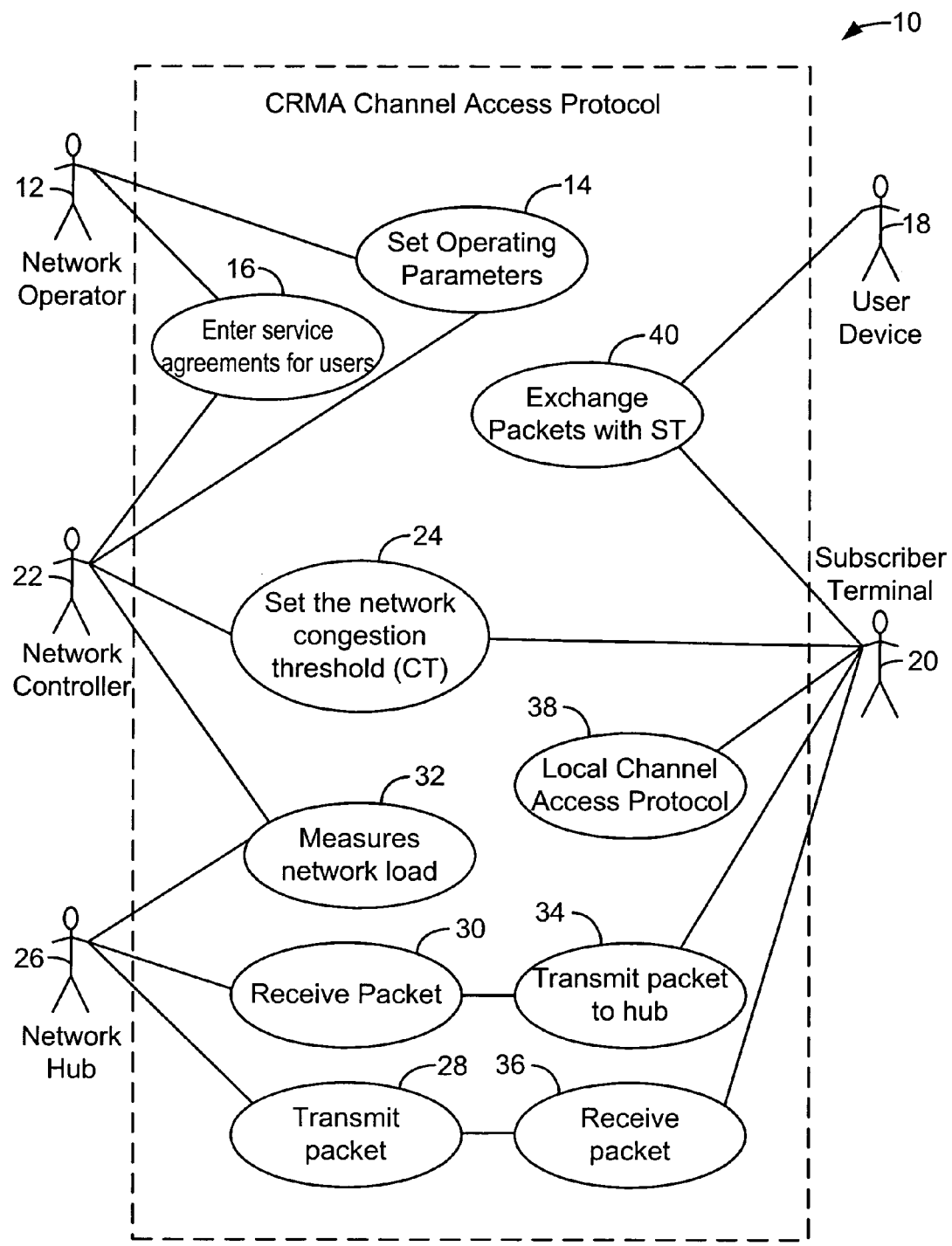
FIG. 1 is a use-case diagram of a Code Reuse Multiple Access (CRMA) Channel Access Protocol (CCAP).

FIG. 1 is an overview in a Use-Case diagram 10 which illustrates schematically each of the components of the invention and each of the cases in which the components or "actors" participate.

The actors include:

A Network Operator 12: The Network Operator 12 is the entity including the people and business concerns of a service provider (SP) that set the service policies (including quality of service (QOS) parameters) including the services of setting of operating parameters 14 and entering service agreements 16 for users of user devices 18 and subscriber terminals 20.

A Network Controller 22: The Network Controller 22 is the service in the form of computer software which computes a congestion threshold (CT) using parameters set by the Network Operator 12 and based on the measurements taken by a Network Hub 26.

A Network Hub 26: The Network Hub 26 comprises the communications equipment (antennas, radios, modems and software) which transmits packets 28 and receives packets 30 from subscriber terminals 20 and measures the network load 32, that is, the amount of traffic being presented to the network. In general, any or even all of the subscriber terminals can perform the network load measurement, so long as they can receive the shared channel.

A Subscriber Terminal 20: The Subscriber Terminal 20 comprises the communication equipment at the user premises that has the functions of transmitting data to 34 and receiving data from 36 the Network Hub 26 and performs the local portion of the channel access protocol 38 as herein explained.

A User Device 18: The User Device 18 is the local computer (or other network device) located at the customer premises where the network traffic originates and terminates. It has the function of exchanging packets 40 with the subscriber terminal 20.

The basic embodiment of the CRMA Channel Access Protocol (CCAP) provides for robust access to the shared CRMA channel according to a best-efforts (BE) services standard. BE services provide no guarantees of minimum throughput or delay. According to the invention, the CRMA CAP services are extended by providing network services with a guaranteed quality of service (QOS). This extension is explained further herein.

Figure 2:
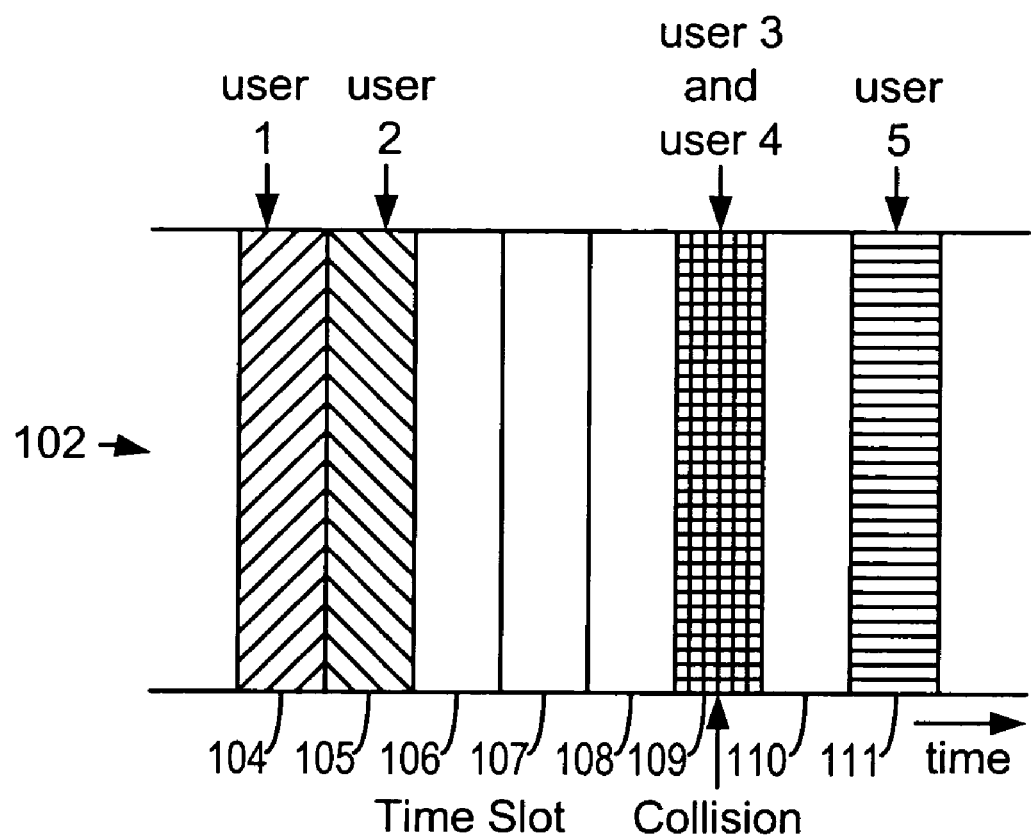
FIG. 2 is a diagram of operation of a method of the prior art.

It is useful to examine prior art Multiple User Single Simultaneous Access ((MUSSA) channel configurations for comparison. Referring to FIG. 2, a MUSSA channel 102 of the prior art is divided into time slots 104-111 that can accommodate exactly one user at a time. In this example, User 1 and User 2 transmit successfully in adjacent time slots 104, 105, but User 3 and User 4 both attempt to use the same time slot 109, and both are unsuccessful, an event known as a collision. User 5 then transmits successfully in timeslot 111. For maximum throughput in such channels, the channel usage must be limited so that, on average, only a small fraction of the slots are used. As a result of this limitation, the collisions that do occur are almost always between exactly two users. In this example, the other three users were able to transmit successfully, while the two colliding transmissions were lost and would require a further attempt, thus reducing ultimate channel throughput.

Figure 3A:
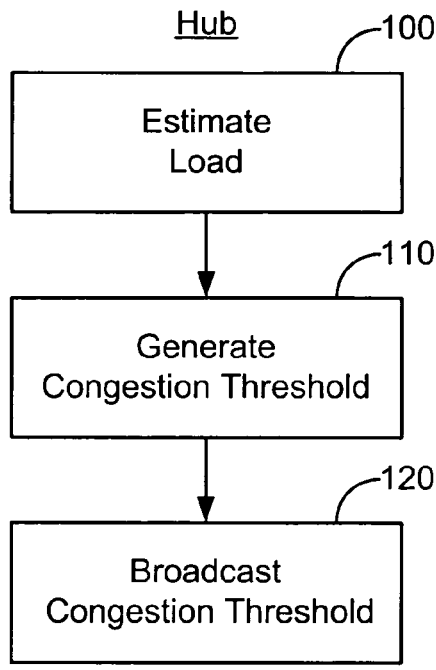
FIG. 3A is a high level flow diagram for illustrating load estimate techniques at a network controller of the prior art.
Figure 3B:
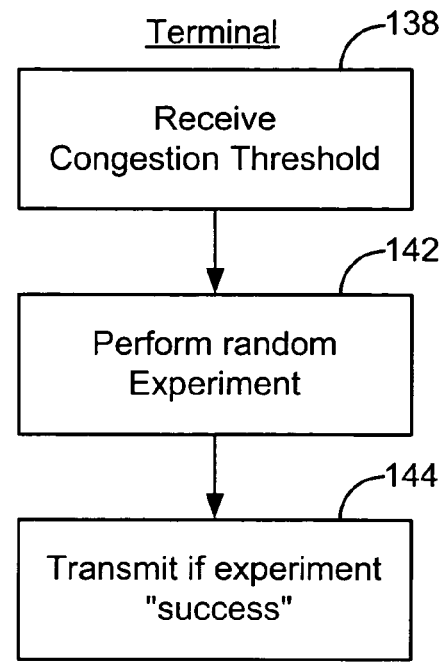
FIG. 3B is a high level flow diagram for illustrating load estimate techniques at a terminal of the prior art.

Referring to FIG. 3A, at a high level, the network controller 22 of the prior art estimates load (Step 100), generates a congestion threshold value or equivalent (Step 110) and broadcasts the congestion threshold value to all subscriber terminals (Step 120). Referring to FIG. 3B, at each subscriber terminal 20 in the prior art, the congestion threshold value is received (Step 130), performs a random experiment using the received congestion threshold (Step 140), and broadcasts the packet to the hub 26) if the experiment is a success (Step 150).

Figure 3C:
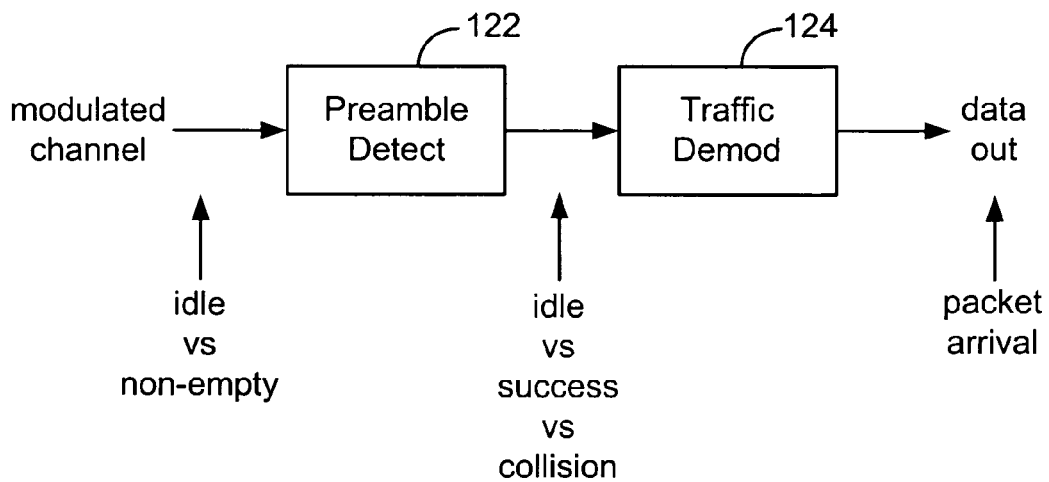
FIG. 3C is a diagram for illustrating load estimate techniques at a network controller.

Referring to FIG. 3C, according to the prior art, various techniques are employed to estimate load at the hub 26, which has a preamble detector 122 to detect from the incoming channel, and it has a traffic demodulator 124 to provide data output. The incoming modulated channel can be sampled to determine whether it is idle or non-empty during the sampling interval. After the preamble detector, the data can be monitored for idle, successful packet transmission or collision. After the traffic demodulator 124 the data stream can be monitored for packet arrival.

Figure 4A:
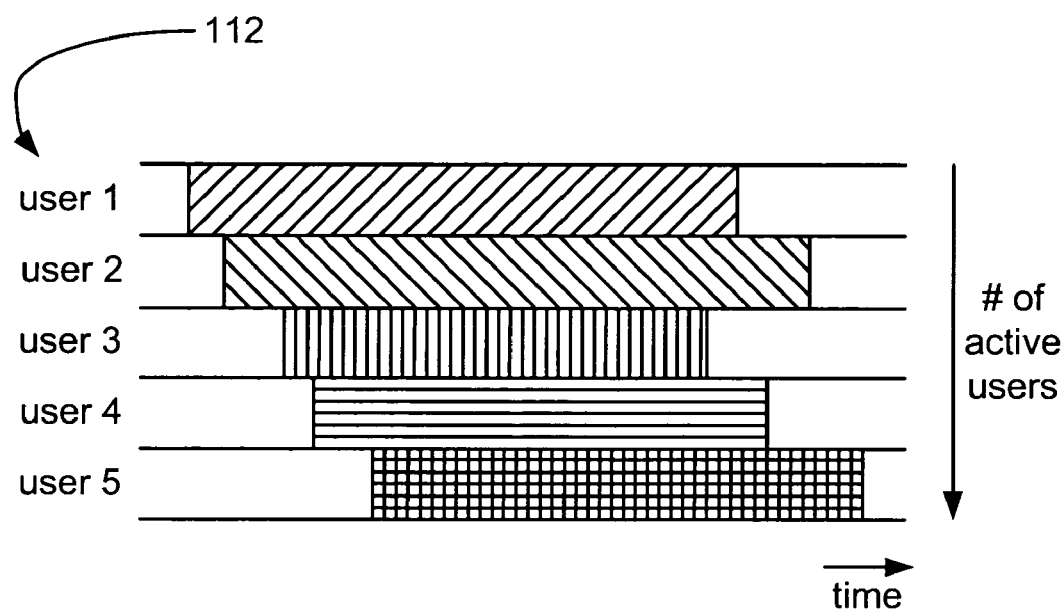
FIG. 4A is a diagram of operation of a method according to the invention.

Referring to FIG. 4A, a Multiple User Multiple Simultaneous Access (MUMSA) channel 112 of the invention is depicted. The MUMSA channel 112 is not divided into time slots. Successful transmissions from a number of users can overlap in time, made possible by use of Pseudo Noise (PN) spreading sequences. Each transmission is not time aligned with the other transmissions and the transmissions can also vary in length, as opposed to the fixed length, slotted transmissions of the channel 102 of FIG. 2. Here, the number of active users on the channel can vary instantaneously while always taking on integer values. Although not shown in this example, a rough analog of the MUSSA collision will occur when the instantaneous number of active users exceeds the maximum number of transmissions that the channel can support. In this MUMSA collision, by definition, a large number of transmissions are lost, as opposed to the two transmissions typically lost in a MUSSA collision. As the number of simultaneous users increases, however, the statistical behavior of the channel can be more accurately predicted upon which the present invention capitalizes.

Figure 4B:
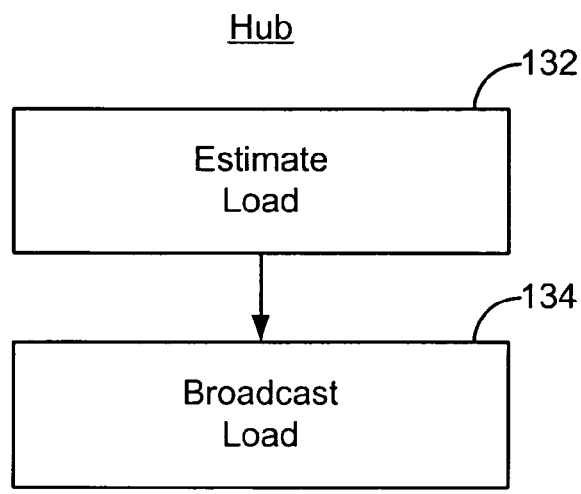
FIG. 4B is a high level flow chart of operation related to quality of service at the network controller.
Figure 4C:
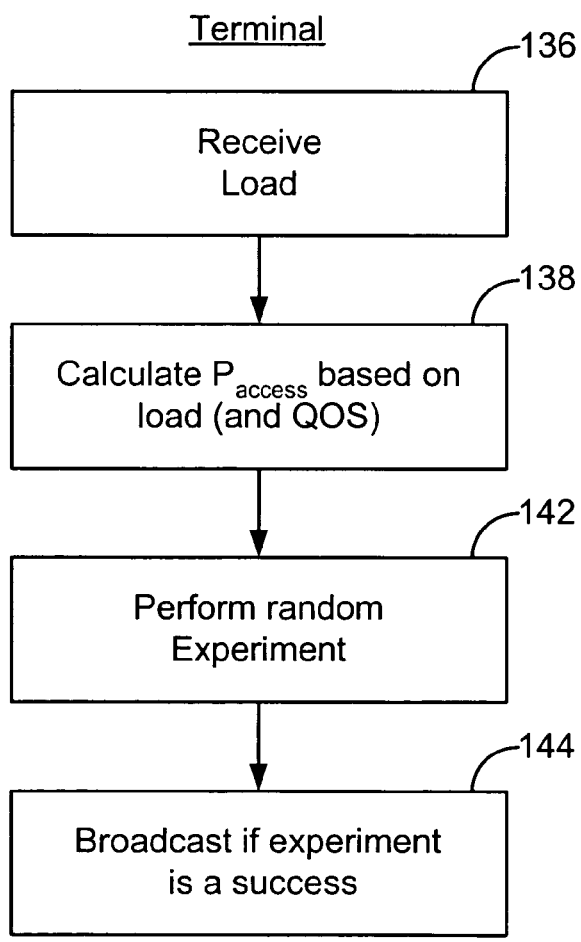
FIG. 4C is a high level flow chart of operation related to quality of service at a user terminal.

Referring to FIG. 4B, according to a specific embodiment of the invention, a combination of congestion threshold and quality of service activities are performed at the hub 26 which are used to estimate load (Step 132), and the hub 26 broadcasts the load (Step 134), whereupon the terminal 20 (FIG. 4CB) receives the load (Step 136), calculates a congestion threshold value, specifically a probability of access based on load and quality of service, as described (Step 138), then performs a random experiment (Step 142) with the locally-calculated congestion threshold and broadcasts the packet if the experiment is a success (Step 144). Each subscriber terminal enjoys this autonomy.

Figure 5:
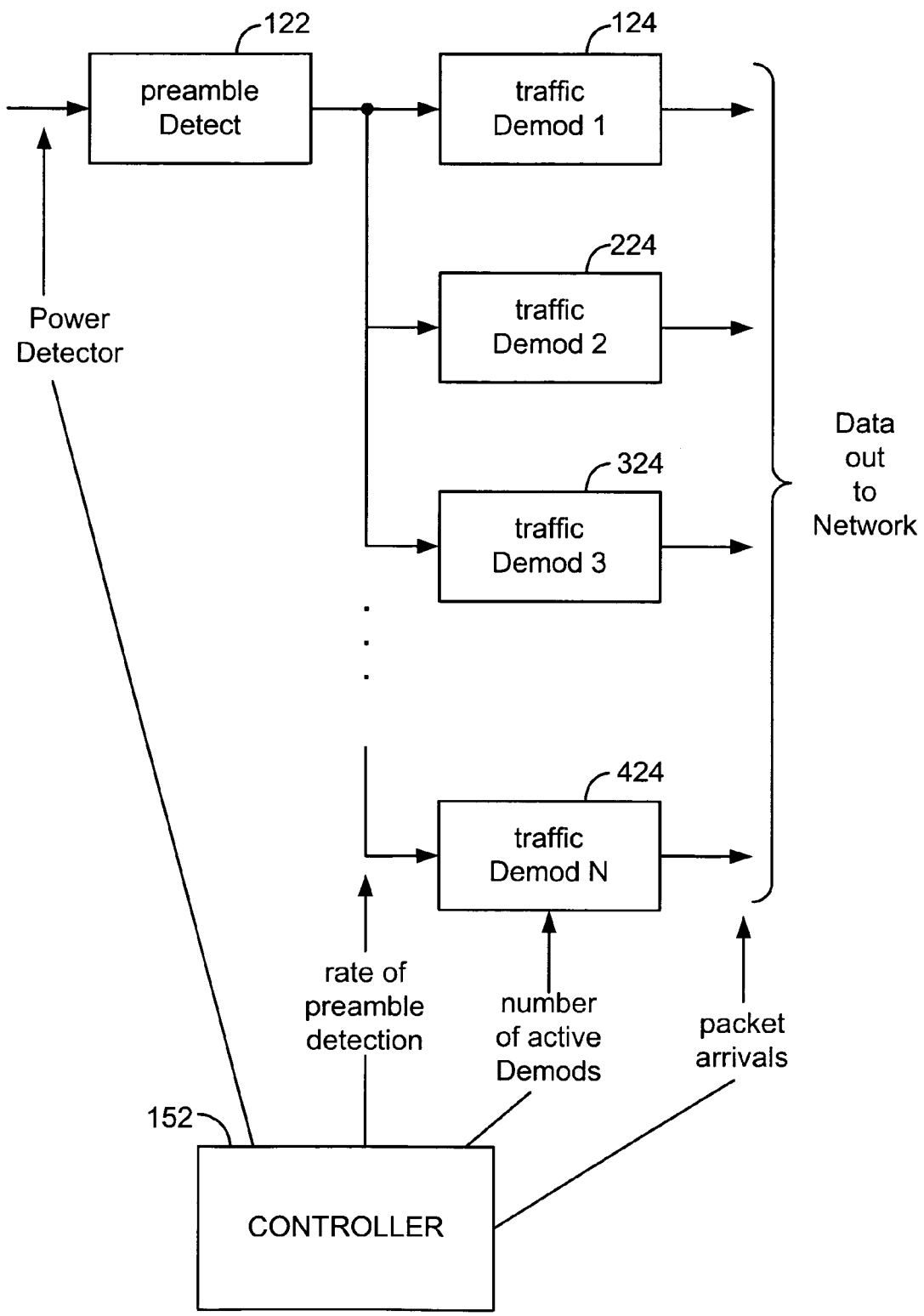
FIG. 5 is a diagram for illustrating a basic apparatus for performing a load estimation technique.

In accordance with the invention, and referring to FIG. 5, in order to allow a number of active load estimates to proceed autonomously and with greater versatility, a controller 152 senses the rate of preamble detections at the output of a preamble detector 122, and further senses the number of active traffic demodulators 124, 224, 324, 424. The controller 152 alternatively senses the received power into the preamble detector and/or tests for packet arrivals at their outputs to the network. These tests can be combined.

These options provide for a finer resolution estimate of the instantaneous load of the network.

Figure 6:
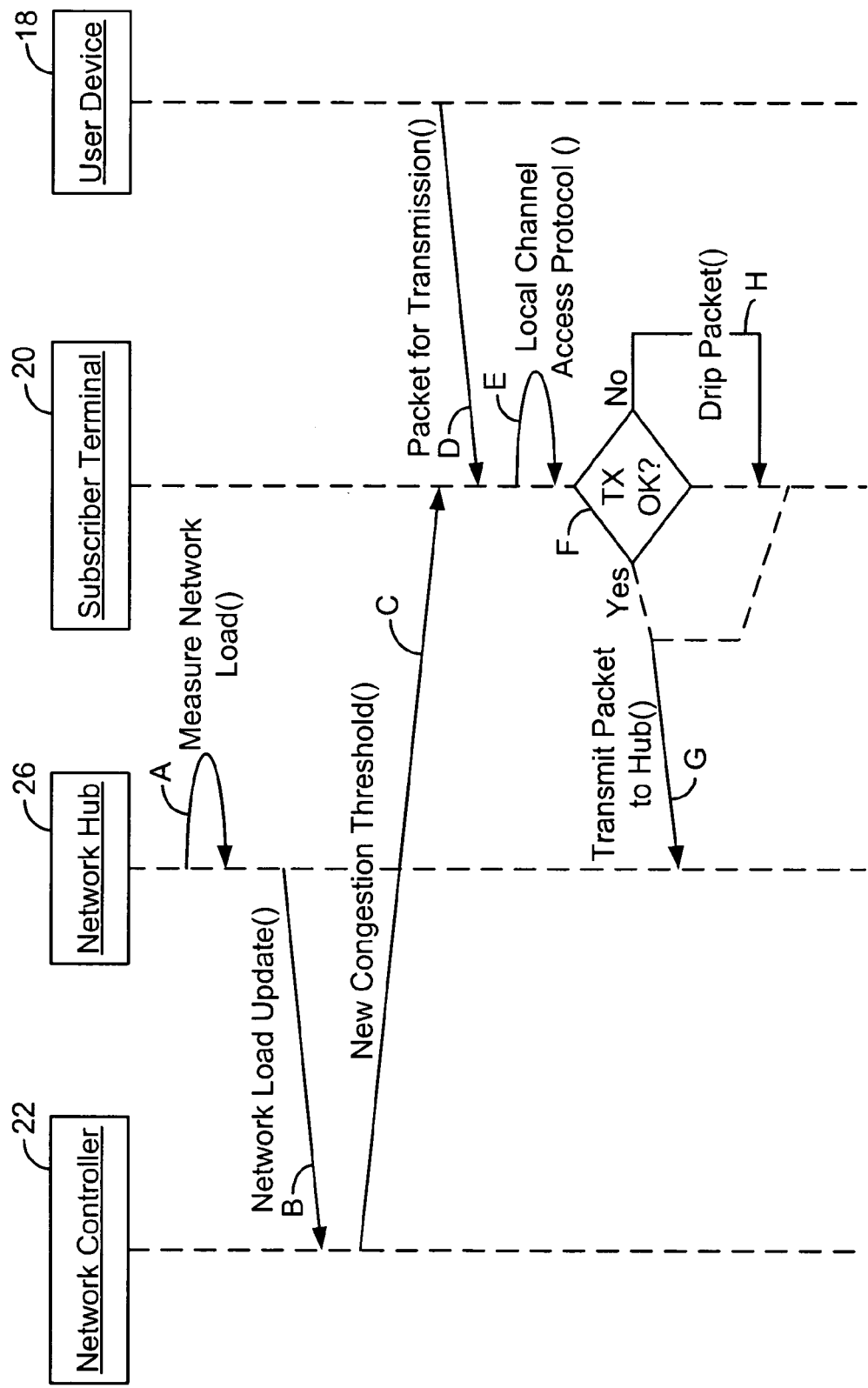
FIG. 6 is a timing diagram showing the computation of a congestion threshold and its application to congestion control.

The CCAP with extensions according to the invention are performed by the network controller 22 and by the subscriber terminals 20. The basic sequence of this protocol is shown in FIG. 6. The Network Hub 26 measures the network load by a process not directly germane to this invention (Step A) and reports with a Network Load Update to the Network Controller 22 (Step B). The Network Controller 22 conveys a new congestion threshold to the Subscriber Terminal 20 (Step C) in preparation for receipt of the next packet for transmission from the User Device 18 (Step D). The local access protocol (Step E) is invoked at the Subscriber Terminal 20 for the packet received for transmission whereupon the decision is made as to whether the packet is to be transmitted (Step F). If so, it is transmitted to the Network Hub 26 (Step G). If not, the packet is dropped (Step H).

Figure 7:
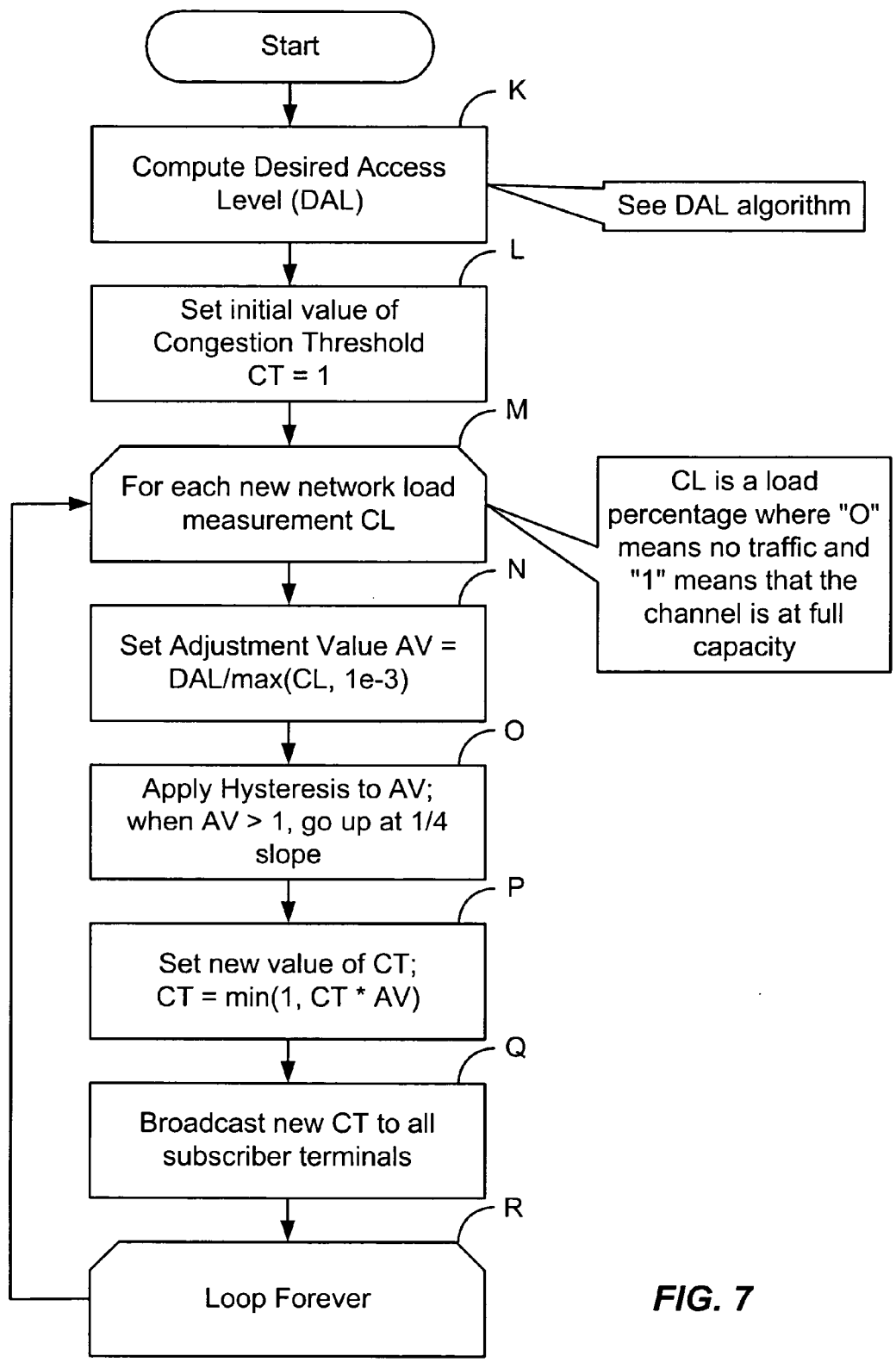
FIG. 7 is a flow chart of a technique for determining and disseminating a congestion threshold value.

FIG. 7 is a flow chart for computation of the congestion threshold at the Network Controller 22. First a desired access level (DAL) is computed, as hereinafter explained (Step K). An initial value of the congestion threshold is set or preset to 100% (CT=1) (Step L). An iterative process begins with each new network load measurement to establish a channel load CL from zero (CL=0) to 100% (CL=1) (Step M). An adjustment value AV is set as the desired access level divided by channel load (DAL/CL) or more precisely, the desired access level divided by the maximum of the channel load or 0.001 (where 0.001 is set to avoid a division by zero) (Step N). Hysteresis is applied to the adjustment value (AV) so that when AV>1, it goes up at 1/4 slope (Step O). Thereafter, the new congestion threshold is set to be the old congestion threshold multiplied by the adjustment value up to a value of 100%, or more precisely, the minimum of 1 and CT*AV (Step P). This new congestion threshold is then broadcast to all subscriber terminals (Step Q). and the iteration repeats (Step R).

The desired access level (DAL) is computed based on the capacity of the system (in terms of number of possible simultaneous transmissions without degradation) and the quality requirements (in terms of packet error rates).

Below is a depiction of the process for determining the probability P of access for a given network capacity:

Assuming a Poisson process and a given access rate "r" the probability of exactly "k" accesses is:

$$Paccess(r,k) := \frac{r^k \times e^{-r}}{k}$$

Determine the percentage of time that it is acceptable for the number of transmissions to exceed multiple access threshold ($P_{excess}$). For a given network capacity, expressed as the Multiple Access Threshold M, and a given rate of transmissions we know $$\sum_{k=M+1}^{\infty} Paccess(r,k) = P_{excess}$$

So, just find the maximum rate "r" such that:

$$\sum_{k=1}^{M} Paccess(r,k) < 1 - P_{excess}$$

Figure 8:
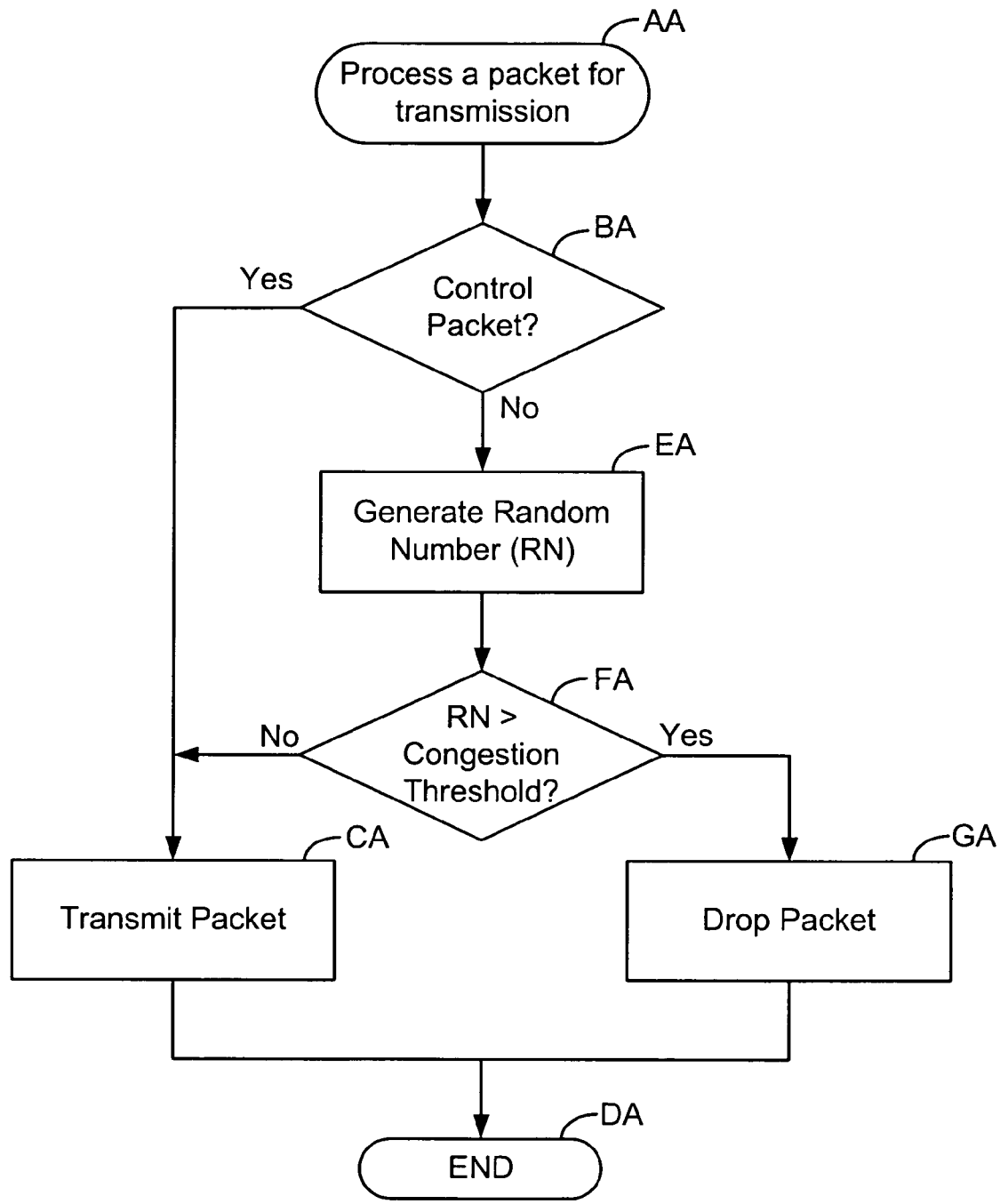
FIG. 8 is a flow chart illustrating how a local portion of the access protocol is performed at each terminal.

The Congestion Threshold (CT) is used by each subscriber terminal in the network to perform the local portion of the CCAP, as explained in connection with FIG. 8. Between the network controller 22 and a representative Subscriber Terminal (ST) 20, the first step is to process a packet for transmission (Step AA), then determine whether it is a control packet (Step BA), and if not, to transmit the packet (Step CA) then end (Step DA) to prepare to repeat the process. If it is a control packet, then a (pseudo-)random number is generated Step EA) and tested against a threshold (Step FA) established by policy or default. If the threshold is not met, the packet is transmitted (Step CA), otherwise it is dropped (Step GA) and the process is ended (Step DA) to be prepared to repeat.

The quality of services (QOS) extensions to this invention allow the network to offer services with a guaranteed QOS in terms of a guaranteed minimum data rate and guaranteed maximum packet error rate. This is accomplished by the addition of a mechanism to admit QOS services into the network and by modification of the processes undertaken in the Network Controller to set the Congestion Threshold (CT) and the algorithm in the Subscriber Terminal to perform the Local CCAP.

Figure 9:
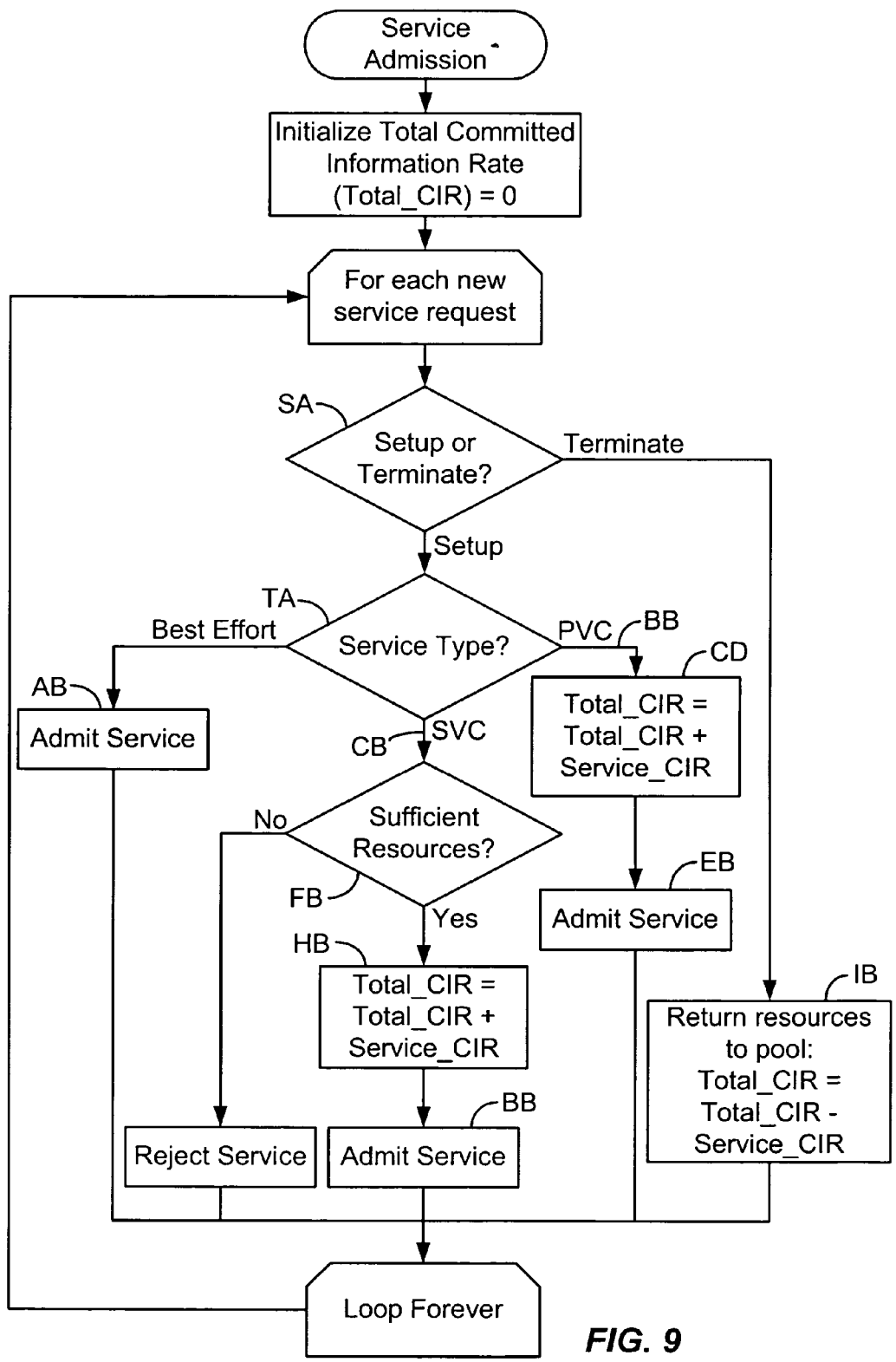
FIG. 9 is a flow chart illustrating the algorithm for setup and teardown of virtual circuits at the network terminal for each request from a subscriber terminal.

A Service Admission Protocol (SAP) for the QOS extensions is shown in FIG. 9. After setup (Step SA), service types are determined (Step TA), and all Best Effort (BE) services are automatically admitted (Step AB), since no guarantees are made for these services. QOS extensions are provided on a virtual circuit basis: a terminal may have one or more virtual circuits. The QOS extensions fall into two categories: Permanent Virtual Circuits (PVCS) (Step BB) and Switched Virtual Circuits (SVCS) (Step CB). PVCs are allocated on a long-term basis and must always be admitted (Step EB). SVCs are allocated on request and are admitted (Step GB) if the resources are available to meet the service level agreement of the request (Step FB). It is thus important that safeguards be built into the service management system to prevent over-commitment of PVCs. These safeguards are the subject to the service provider's policies, which will rely on the capacity provided by the subject invention.

The network controller also uses the algorithm of FIG. 9 to maintain a running tally of the committed information rate (Total_CIR) (Steps DB, HB, IB). This is used in a modified version of the Congestion Threshold (CT) calculation, as follows:

Compute BE_Load=max(CL-Total_CIR,1)
Compute BE_DAL=DAL-Total_CIR
Compute BE_Load=max(CL-Total_CIR, 1)
Compute BE_DAL=DAL-Total_CIR
AV=BE_DAL/BE_Load
Apply Hysteresis to AV, AV>1, go up at 1/4 slope
Set CT=min(1, CT*AV)

Figure 10:
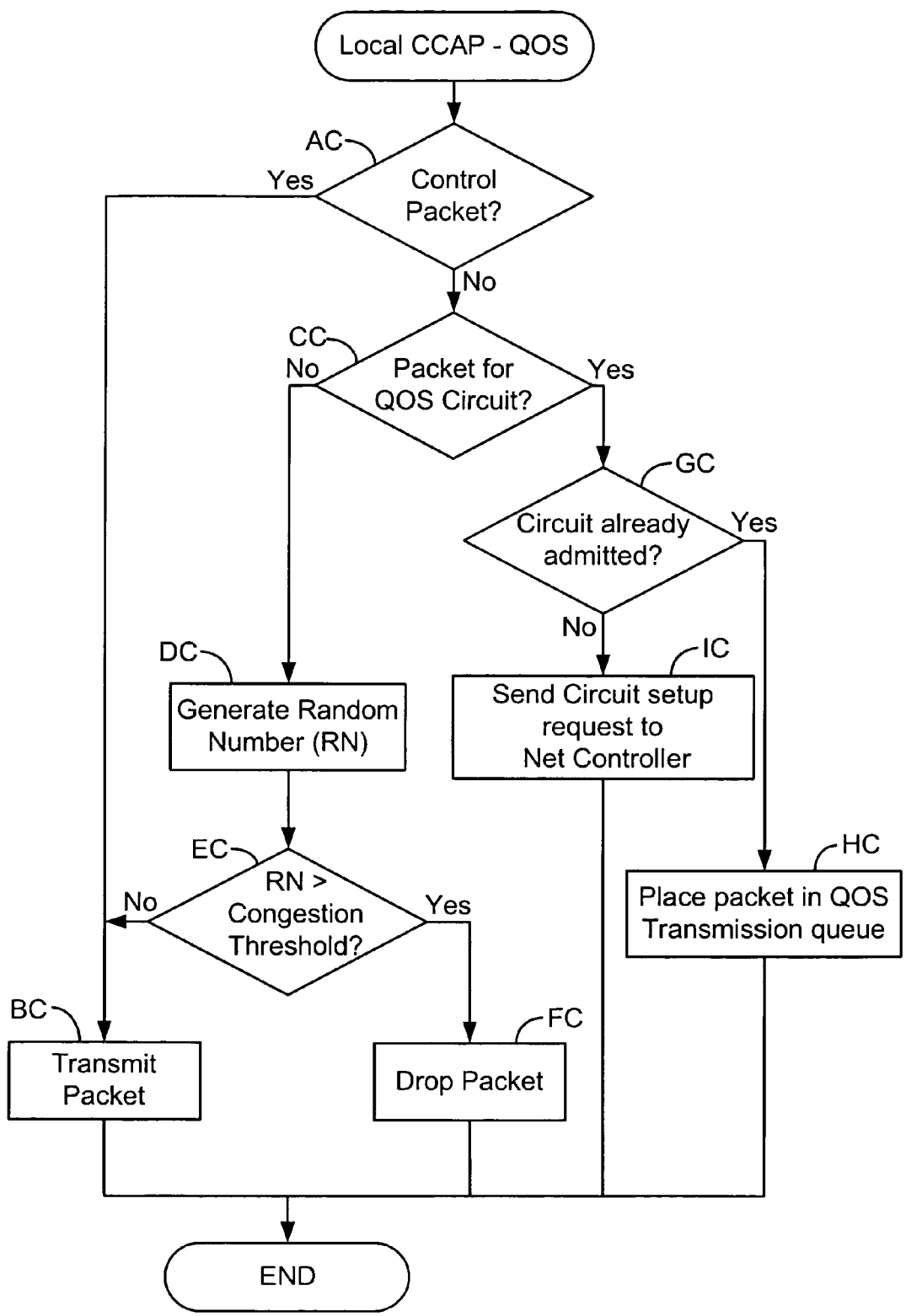
FIG. 10 is a flow chart for the handling of a packet according to a local MUMSA-CAP-QOS at a subscriber terminal.

The Subscriber Terminal then uses a modified version of the Local CCAP (herein Local CCAP-QOS) for handling each packet. This is shown in FIG. 10. The control packets are identified (Step AC), bypass the QOS process and are transmitted (Step BC). Packets not intended for the QOS circuit are identified (Step CC), a random number is generated (Step DC) and compared with the congestion threshold (EC). If less than the congestion threshold the packet is dropped (Step FC) rather than transmitted.

The packet is tested to determine if the packet is intended for the QOS circuit (Step GC), whereupon it is placed in the QOS transmission queue (Step HC) and not immediately transmitted. The packets is then processed according to the QOS transmission queue handling procedures. If not, then a circuit setup request is sent to the network controller (Step IC).

The QOS packets which have been placed in a QOS Transmission Queue are handled as noted in Step HC, wherein, according to the invention, packets must be transmitted at least at a rate provided by the service agreement CIR. The terminal may also transmit packets at rates beyond the CIR, assuming there is network capacity. For transmission of the excess packets, the subscriber terminal simply applies the standard CCAP algorithm.

When the transmission queue is empty for a sufficient length of time, or when the service is terminated via a higher layer protocol, the Subscriber Terminal must send a request to tear-down the virtual circuit.

The invention has been explained with reference to specific embodiments. Other embodiments will be evident to those of ordinary skill in the art. For example, while the invention has been explained with reference to operation where traffic through a hub is measured, the invention has broader applications. Therefore it is not intended that the invention be limited, except as indicated by the appended claims.

What is claimed is:

1. A method for managing data traffic in a multiple-user environment having true random access with more than one transmission present simultaneously, the method comprising the steps of:

estimating channel load of multiple users at multiple terminals in multiple simultaneous accesses;

calculating on an ongoing basis a congestion threshold value using said estimate of channel load;

selecting a current congestion threshold value; then at each said terminal, performing an experiment comparing the current congestion threshold value with a random number from a random number generator to obtain a transmission value determinative of whether a packet is eligible to be transmitted by each said terminal;

throttling random transmission of packets according to said transmission value so that a transmitted load from all said terminals has a rate of packet transmission that is less than the current congestion threshold value times an offered load offered to the terminal; and wherein said estimate of channel load is probability of access and the current congestion threshold value is related to probability of a globally successful transmission of a number of simultaneously transmitted packets.

2. The method according to claim 1 further including the step of, at each said terminal, throttling the channel load according to a quality of service factor.

3. The method according to claim 2 wherein said current congestion threshold is broadcast and said quality of service factor is broadcast at least as frequently as a current congestion threshold value.

4. The method according to claim 1 wherein a quality of service factor is committed to each said terminal for use in additionally throttling the channel load and assuring transmission of selected packets.

5. The method according to claim 1 wherein said estimating of channel load is at a hub where traffic of multiple users is monitored.

6. The method according to claim 5 further including the step of, at each said terminal, throttling the channel load according to a quality of service factor.

7. The method according to claim 6 wherein said current congestion threshold is broadcast and said quality of service factor is broadcast at least as frequently as a current congestion threshold value.

8. The method according to claim 5 wherein a quality of service factor is committed to each said terminal for use in additionally throttling the channel load and assuring transmission of selected packets.

* * * * *